(12) United States Patent
Chan et al.

(10) Patent No.: US 8,968,929 B2
(45) Date of Patent: Mar. 3, 2015

(54) SILICON CLATHRATE ANODES FOR LITHIUM-ION BATTERIES

(75) Inventors: Kwai S. Chan, San Antonio, TX (US); Candace K. Chan, San Antonio, TX (US); Wuwei Liang, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 865 days.

(21) Appl. No.: 12/842,224

(22) Filed: Jul. 23, 2010

(65) Prior Publication Data

US 2012/0021283 A1    Jan. 26, 2012

(51) Int. Cl.
| | |
|---|---|
| *H01M 4/13* | (2010.01) |
| *H01M 4/88* | (2006.01) |
| *C01B 33/02* | (2006.01) |
| *H01M 4/134* | (2010.01) |
| *H01M 4/1395* | (2010.01) |
| *H01M 10/0525* | (2010.01) |

(52) U.S. Cl.
CPC ............ *H01M 4/134* (2013.01); *H01M 4/1395* (2013.01); *H01M 10/0525* (2013.01); *Y02E 60/122* (2013.01)
USPC ...................... 429/218.1; 252/182.1; 423/348

(58) Field of Classification Search
None
See application file for complete search history.

(56) References Cited

U.S. PATENT DOCUMENTS

| | | | |
|---|---|---|---|
| 5,800,794 A | 9/1998 | Tanigaki et al. | |
| 6,188,011 B1 | 2/2001 | Nolas et al. | |
| 6,423,286 B1 | 7/2002 | Gryko | |
| 6,461,581 B1 | 10/2002 | Eguchi et al. | |
| 7,534,414 B2 | 5/2009 | Nolas et al. | |
| 8,722,247 B2 | 5/2014 | Miller et al. | |
| 2003/0197156 A1 | 10/2003 | Eguchi et al. | |
| 2008/0226836 A1 | 9/2008 | Nolas et al. | |
| 2011/0226299 A1 | 9/2011 | Makansi | |
| 2011/0253205 A1 | 10/2011 | Grossman et al. | |
| 2012/0295160 A1 | 11/2012 | Miller et al. | |
| 2013/0280609 A1 | 10/2013 | Chan et al. | |

FOREIGN PATENT DOCUMENTS

WO    2013158307 A1    10/2013

OTHER PUBLICATIONS

San-Miguel, et al., "High-pressure properties of group IV clathrates." High Pressure Research 2005, 25(3), 159-185.

Nakano, et al., "Soft xray photoelectron spectroscopy in silicon clathrate superconductors," SPring-8 Res Front 2001B/2002A, p. 51-53 (2003).

Grovenstein, et al., "Cleavage of tetraalkylammonium halides by sodium in liquid ammonia" J. Am. Chem. Soc. 1959, 81, 4850-4857.

(Continued)

*Primary Examiner* — Milton Cano
*Assistant Examiner* — Sarah A Slifka
(74) *Attorney, Agent, or Firm* — Grossman, Tucker et al (57) ABSTRACT

The present disclosure is directed at an electrode and methods for forming such electrode for a battery wherein the electrode comprises silicon clathrate. The silicon clathrate may include silicon clathrate $Si_{46}$ containing an arrangement of 20-atom and 24-atom cages fused together through 5 atom pentagonal rings and/or silicon clathrate $Si_{34}$ containing an arrangement of 20-atom and 28-atom cages fused together through 5 atom pentagonal rings. The silicon clathrate may be present as particles having a largest linear dimension in the range of 0.1 µm to 100.0 µm.

22 Claims, 8 Drawing Sheets

(56) References Cited

OTHER PUBLICATIONS

Manthiram, et al., "Low temperature synthesis of insertion oxides for lithium batteries." Chem. Mater. 1998, 10, 2895-2909.

Adams et al., Wide-band-gap Si in open fourfold-coordinated clathrate structures, The American Physical Society, Physical Review B, Mar. 15, 1994, pp. 8048-8053, vol. 49, No. 12.

Beattie et al., Si Electrodes for Li-Ion Batteries—A New Way to Look at an Old Problem, Journal of the Electrochemical Society, 2008, pp. A158-A163, vol. 155 (2).

Brooksbank et al., Tessellated Stresses Associated With Some Inclusions in Steel, Journal of the Iron and Steel Institute, Apr. 1969, pp. 474-483.

Chan et al., High-performance lithium battery anodes using silicon nanowires, nature nanotechnology—Letters, Jan. 2008, pp. 31-35, vol. 3.

Connetable et al, Superconductivity in Doped sp3 Semiconductors: The Case of the Clathrates, The American Physical Society—Physical Review Letters, Dec. 12, 2003, pp. 247001-1-247001-4, vol. 91, No. 24.

CPMD—Car-Parrinello Molecular Dynamics—Manual, An ab initio Electronic Structure and Molecular Dynamics Program, The CPMD consortium, Sep. 4, 2008, 258 pages.

Cui et al., Crystalline-Amorphous Core-Shell Silicon Nanowires for High Capacity and High Current Battery Electrodes, American Chemical Society—Nano Letters, Dec. 1, 2008, 5 pages.

Eom et al., Electrochemical Insertion of Lithium into Multiwalled Carbon Nanotube/Silicon Composites Produced by Ballmilling, Journal of the Electrochemical Society, 2006, pp. A1678-A1684, vol. 153 (9).

Graetz et al., Highly Reversible Lithium Storage in Nanostructured Silicon, Electrochemical and Solid-State Letters, 2003, A194-A197, vol. 6 (9).

Green et al., Structured Silicon Anodes for Lithium Battery Applications, Electrochemical and Solid-State Letters, 2003, A75-A79, vol. 6 (5).

Huggins et al., Decrepitation Model for Capacity Loss During Cycling of Alloys in Rechargeable Electrochemical Systems, Ionics, 2000, 8 pages, vol. 6.

Kim et al., Three-Dimensional Porous Silicon Particles for Use in High-Performance Lithium Secondary Batteries Angewandte Chemie—Anode Materials, 2008, pp. 10151-10154, vol. 47.

Ryu et al, Failure Modes of Silicon Powder Negative Electrode in Lithium Secondary Batteries, Electrochemical and Solid-State Letters, 2004, A306-A309, vol. 7 (10).

Takamura et al., A vacuum deposited Si film having a Li extraction capacity over 2000 mAh/g with a long cycle life, Journal of Power Sources, 2004, pp. 96-100, vol. 129.

Lewis et al., In Situ AFM Measurements of the Expansion of Contraction of Amorphous Sn—Co—C Films Reacting with Lithium, Journal of the Electrochemical Society, 2007, pp. A213-A216, vol. 154 (3).

Melinon et al., Phonon density of states of silicon clathrates: Characteristic width narrowing effect with respect to the diamond phase, The American Physical Society, Apr. 15, 1999, pp. 10 099-10 104, vol. 59, No. 15.

Miguel et al., A New Class of Low Compressibility Materials: Clathrates of Silicon and Related Materials, High Pressure Research, 2002, pp. 539-544, vol. 22.

Timmons et al., In Situ Optical Observations of Particle Motion in Alloy Negative Electrodes for Li-Ion Batteries, Journal of the Electrochemical Society, 2006, pp. A1206-A1210, vol. 153 (6).

Timmons et al., Isotropic Volume Expansion of Particles of Amorphous Metallic Alloys in Composite Negative Electrodes for Li-Ion Batteries, Journal of the Electrochemical Society, 2007, pp. A444-A448, vol. 154 (5).

Wen et al., Chemical Diffusion in Intermediate Phases in the Lithium-Silicon System, Journal of Solid State Chemistry, 1981, pp. 271-278, vol. 37.

Yang et al., Small particle size multiphase Li-alloy anodes for lithium-ion-batteries, Solid State Ionics, 1996, pp. 281-287, vol. 90.

Zhang et al., Composite anode material of silicon/graphite/carbon nanotubes for Li-ion batteries, Electrochimica Acta, 2006, pp. 4994-5000, vol. 51.

Zhang et al., Pyrolytic carbon-coated silicon/Carbon Nanotube composites: promising application for Li-ion batteries, Int. J. Nanomanufacturing, 2008, pp. 4-15, vol. 2, Nos. 1/2.

Imai et al., Synthesis of a Si-clathrate Compound, $Sr_8Ga_xSi_{46-x}$, and its Electrical Resistivity Measurements; Elsevier Science, Journal of Alloys and Compounds 335 (2002) pp. 270-276.

Tsujii et al., Phase Stability and Chemical Composition Dependence of the Thermoelectric Properties of the Type-I Clathrate $Ba_8Al_xSi_{45-x}$ ($8 \leq x \leq 15$); Elsevier Science, Journal of Solid State Chemistry 184 (2011) pp. 1293-1303.

U.S. Office Action issued Jun. 26, 2013 in U.S. Appl. No. 13/109,704 (16 pgs).

Yoshio et al "Lithium-Ion Batteries, Science and Technologies", 2009 Springer ISBN: 978-0-387-34444-7, e-ISBN: 978-0-387-34445-4, DOI: 10.1007/978-0-387-34445-4.

International Search Report and Written Opinion of the ISA/KR (12 pgs); mail date Jun. 25, 2013; issued in related matter PCT/US2013/032430.

U.S. Office Action issued Mar. 27, 2014 in U.S. Appl. No. 13/452,403 (15 pgs).

SILICON CLATHRATE ANODES FOR LITHIUM-ION BATTERIES

FIELD OF THE INVENTION

The present invention relates to negative electrodes or anodes comprising cage structures such as silicon clathrate particles. Such particles include a variety of geometries which may be combined with a binder and optionally mixed with another conductor such as carbon black to provide an anode configuration. Such anodes offer a relatively large accessible volume for lithium ions within a lithium-ion battery along with a relatively low lithiation strain and relatively high charge and power density including a relatively long calendar life.

BACKGROUND

Lithium-ion batteries are a family of rechargeable battery types in which lithium ions move from a negative electrode to the positive electrode during discharge, and back when charging. More specifically, during discharge, lithium ions $Li^+$ carry current from the negative to the positive electrode through a non-aqueous electrolyte and separator diaphragm. The three primary functional components of the lithium-ion battery are therefore the anode, cathode and electrolyte.

Carbon or graphite has emerged as one of the most popular material for the anode. The cathode is generally one of three materials: a layered oxide (such as lithium cobalt oxide), a polyanion (such as lithium iron phosphate) or a spinel (such as magnesium oxide). Electrolytes may typically be selected from mixtures of organic carbonates such as ethylene carbonate or diethyl carbonate containing complexes of lithium ions.

Both the anode and cathode are therefore materials where the lithium may reversibly migrate. During insertion, lithium moves into the electrode. During extraction, lithium moves back out. The cathode half reaction may be written as:

The anode half reaction may be written as:

The overall reaction may be written as:

There is an ongoing need for higher specific capacity materials for higher energy density lithium-ion batteries. Work therefore continues on improving the carbon/graphite anode, which has a theoretical capacity of 372 mAh/g. However, the problems that are associated with finding a replacement material include identifying elements that, when participating in reversible reactions with lithium, do so in a manner that will not compromise anode performance.

SUMMARY

The present disclosure is directed at an electrode for a battery wherein the electrode comprises silicon clathrate. The silicon clathrate may include silicon clathrate $Si_{46}$ containing an arrangement of 20-atom and 24-atom cages fused together through 5 atom pentagonal rings and/or silicon clathrate $Si_{34}$ containing an arrangement of 20-atom and 28-atom cages fused together through 5 atom pentagonal rings. The silicon clathrate may be present as particles having a largest linear dimension typically in the range of 0.1 μm to 100.0 μm.

In another exemplary embodiment the present disclosure relates to a lithium-ion battery comprising an anode containing silicon clathrate, a cathode and an electrolyte.

In a still further exemplary embodiment the present disclosure relates to a method of forming an electrode comprising combining silicon clathrate in a polymeric binder and forming an electrode wherein the silicon clathrate is present in the binder at a level of 50.0%-95.0% by weight and wherein the silicon clathrate is present as particles having a largest linear dimension typically in the range of 0.1 μm to 100 μm.

BRIEF DESCRIPTION OF THE DRAWINGS

The detailed description below may be better understood with reference to the accompanying figures which are provide for illustrative purposes and are not to be considered as limiting any aspect of the invention.

DETAILED DESCRIPTION

It is initially recognized herein that silicon is an attractive material for use in a lithium ion battery given that it has a theoretical storage capacity of up to 4000 mAh/g, more than ten times that of graphite. The relatively low discharge potential, below 0.5V vs. $Li/Li^+$ is also attractive. Additionally, Si is widely available. In addition, it has also been recognized that the reversible reaction of lithium with silicon may be accompanied by relatively large changes in volume (>300%). If an electrode material containing Si therefore does not have enough space to sufficiently expand, such increase in volume, which is isotropic in amorphous silicon, may cause it to become displaced from the electrode due to impingement on other parts of the material. Such particle motion may cause parts of the Si electrode to become electrically isolated or out of electronic contact with the current collector and therefore not able to participate in the charge storage reactions.

Worthy of note is that in addition to solving the problem of material becoming displaced from an electrode, a relatively large volume mismatch between unlithiated and lithiated phases may result in decrepitation, or breaking up of the material such as pulverization. This may then cause the Si to delaminate from the electrode or form smaller particles that may be disconnected from the current collector.

Figure 1:
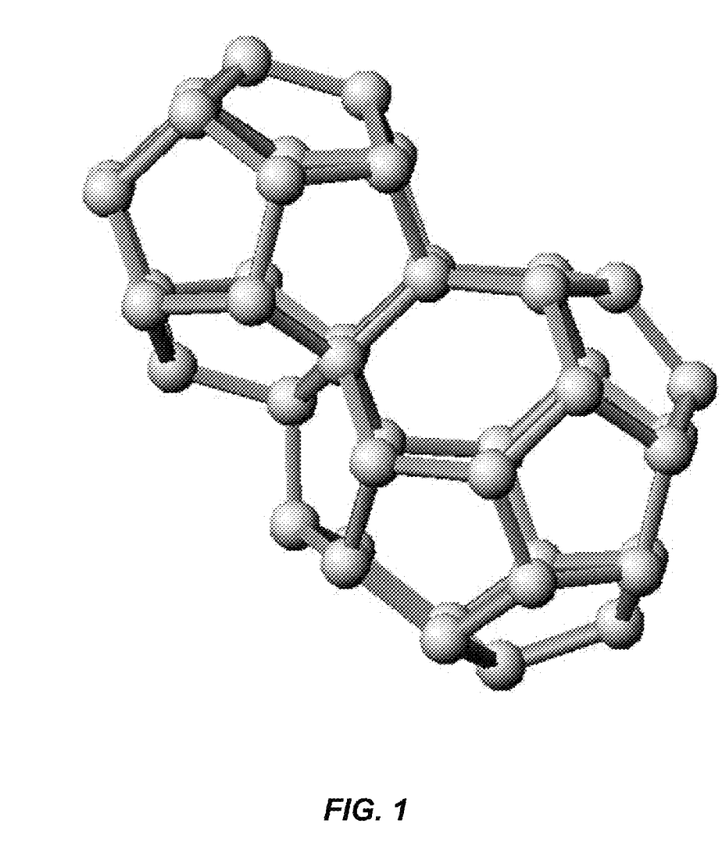
FIG. 1 illustrates $Si_{20}$ and $Si_{24}$ cages as the building unit of the $Si_{46}$ clathrate.

Cage structures, such as silicon clathrates, are disclosed herein as anode materials which may then be utilized in lithium-ion batteries. Silicon clathrates may be understood herein as $sp^3$ bonded silicon atoms arranged in cage-structures. A cage structure is reference to a structure that may optionally trap and contain a second type of molecule. The preferred silicon clathrate $Si_{46}$ comprises crystalline Si with a regular arrangement of 20-atom and 24-atom cages fused together through 5 atom pentagonal rings. Silicon clathrate $Si_{46}$ may be identified as $Si_{46}$ clathrate and may also be identified with the Pearson Symbol cP46. FIG. 1 is a representation of a face-sharing $Si_{20}$ and $Si_{24}$ cages as the building unit of the $Si_{46}$ clathrate. In addition, it should be noted that preferably, the silicon clathrate cage structures herein are such that they do not including doping atoms (e.g. atoms from group 1A, group 2A, group 3A, group 1B, group 2B, group 3B, group 4A, group 5A, group 6A and group 8) encapsulated within the clathrate lattice.

The representative $Si_{46}$ clathrate for use as the anode herein may be further described as having a simple cubic structure with a lattice parameter of 10.335 Å and 46 Si atoms per unit cell. The crystal structure of the $Si_{46}$ clathrate belongs to the Space group Pm$\bar{3}$n and Space Group Number 223. The crystal structure of the silicon clathrate ($Si_{46}$) is different from the common form of crystalline Si (c-Si), which is diamond cubic with a lattice parameter of about 5.456 Å and belongs to the Space Group Fd$\bar{3}$m, Number 227.

Another form of silicon clathrate contemplated for use herein as the anode is $Si_{34}$ (Type II clathrate), that contains crystalline Si with a regular arrangement of 20 atoms and 28 atom cages fused together through 5 atom pentagonal rings. The $Si_{34}$ clathrate has a face-centered cubic (fcc) structure, with 136 Si atoms per fcc unit cell. The $Si_{34}$ clathrate has a lattice parameter of 14.62 Å and belongs to the Space Group Fd$\bar{3}$m, Number 227. A third form of silicon clathrate is a modification of the $Si_{46}$ type formed by removing four atoms from the 24-atom cages.

Figure 2:
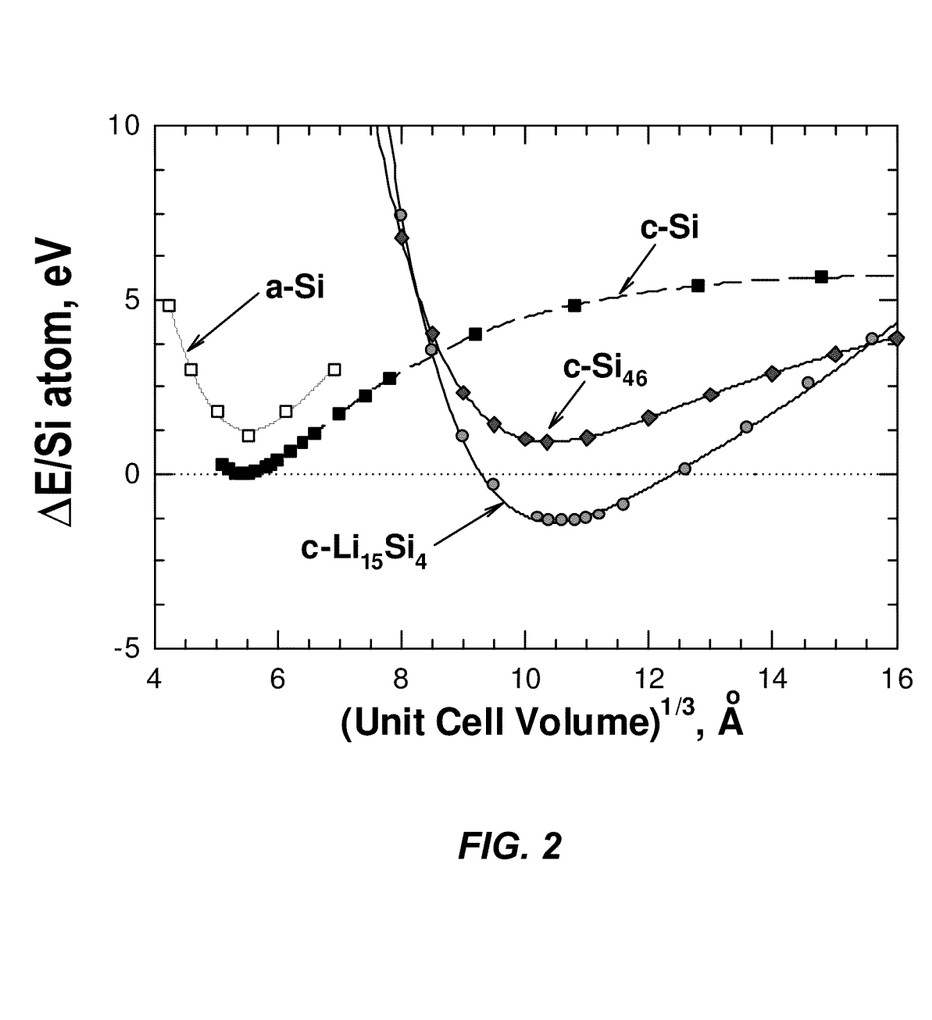
FIG. 2 is a plot of energy change per Si atom as a function of unit cell volume to the ⅓ power for crystalline Si (c-Si), amorphous silicon (a-Si), crystalline $Li_{15}Si_4$ and crystalline $Si_{46}$ clathrate (c-$Si_{46}$).

Computations have now been performed herein using a First-Principles Molecular Dynamic code called CPMD to determine the energy of formation for crystalline Si (c-Si), amorphous Si (a-Si), crystalline $Li_{15}Si_4$ and crystalline $Si_{46}$ clathrate (c-$Si_{46}$). Reference is made to CPMD, Version 3.13, IBM Corporation 1990-2008, MPI fur Festkorperforschung Stuttgart, 1997-2001, http://www.cpmd.org. These results are presented in FIG. 2 which identifies the energy change per Si atom as a function of the unit cell volume to the ⅓ power. The minimum in the energy curve gives the lattice parameter of the unit cell for a crystalline solid or the equivalent length scale for an amorphous solid. These results indicate that the energy of formation for amorphous Si (a-Si) and crystalline silicon clathrate (c-$Si_{46}$) are comparable and both are higher than those of crystalline silicon (c-Si) and crystalline lithium silicide $Li_{15}Si_4$ (c-$Li_{15}Si_4$) as shown in FIG. 2. The lattice parameter of c-Si (5.456 Å) is much smaller than that of $Li_{15}Si_4$ (10.642 Å). The equivalent lattice parameter of amorphous Si (a-Si), defined as $a_o$=(unit cell volume)$^{1/3}$, is about 5.533 Å and is also much smaller than that of $Li_{15}Si_4$ (10.642 Å). In contrast, the lattice parameter of $Si_{46}$ (10.335 Å) matches well with that of $Li_{15}Si_4$ (10.642 Å). Calculations confirm that the lithiation of $Si_{46}$ to form $Li_{15}Si_4$ would result in a volume expansion of only 9.0%, compared with 300% for the lithiation of crystalline Si to form $Li_{15}Si_4$. This preferred value of volume expansion (9.0%) corresponds to a transformation or lithiation strain of 3%, compared to 95% for crystalline Si. Additional calculations also confirm that the lithiation of $Si_{46}$ to form lithium clathrate $L_xSi_{46}$ would result in a preferred volume expansion of less than 1% when the number, x, of Li atoms is 24 or less. Accordingly, in the broad context of the present disclosure the silicon clathrate may be understood as a silicon clathrate that, when configured into an electrode, provides a volume expansion of less than or equal to 12.0%, or in the range of 0.1% to 12.0%.

Figure 3:
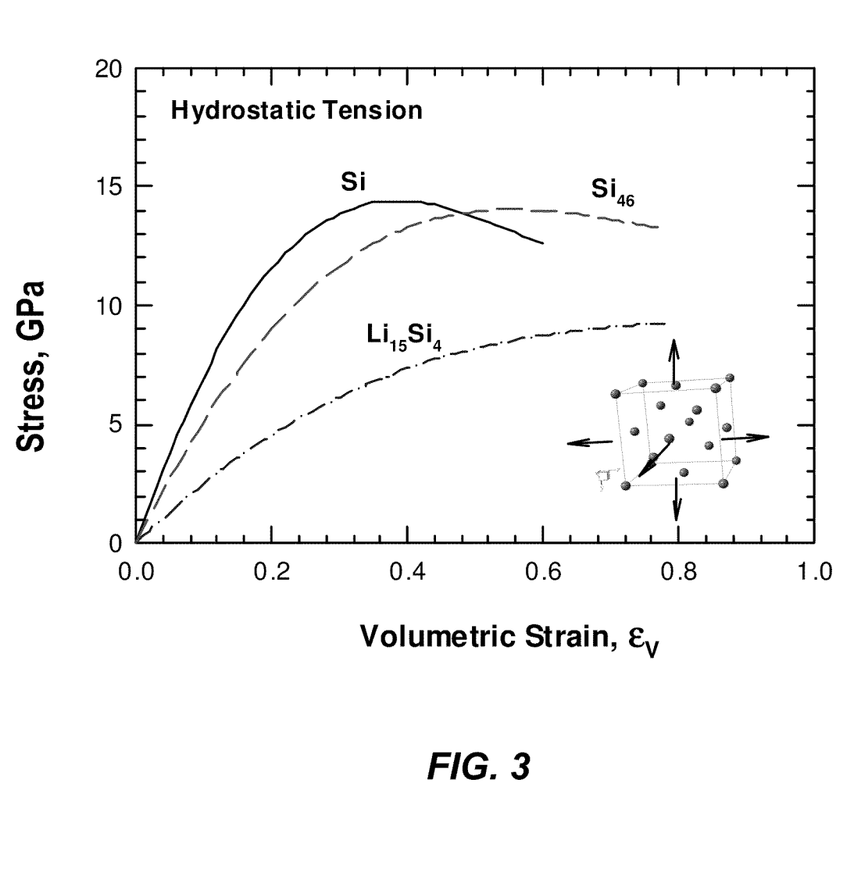
FIG. 3 is a plot of the computed stress-strain curves of c-Si, $Si_{46}$ and $Li_{15}Si_4$ as a function of volume strain for straining under hydrostatic tension.

The theoretical stress-strain curves for c-Si, $Si_{46}$, and $Li_{15}Si_4$ have also now been computed using the CPMD code noted herein. The results for straining under hydrostatic tension are presented in FIG. 3, which depicts the stress as a function of the volumetric strain. The maximum in the stress-strain curve represents the fracture strength of the solid in the absence of a crack. The theoretical strengths of c-Si and $Si_{46}$ are about 14 GPa, while it is about 10 GPa for $Li_{15}Si_4$. The area under the stress-strain curve is related to the surface energy at fracture. The surface energy of $Si_{46}$ is on the order of that for c-Si and both are expected to exhibit similar fracture toughness with a $K_{IC}$ value of 1 MPa(m)$^{1/2}$, where $K_{IC}$ is the critical stress intensity factor at fracture.

Figure 4A:
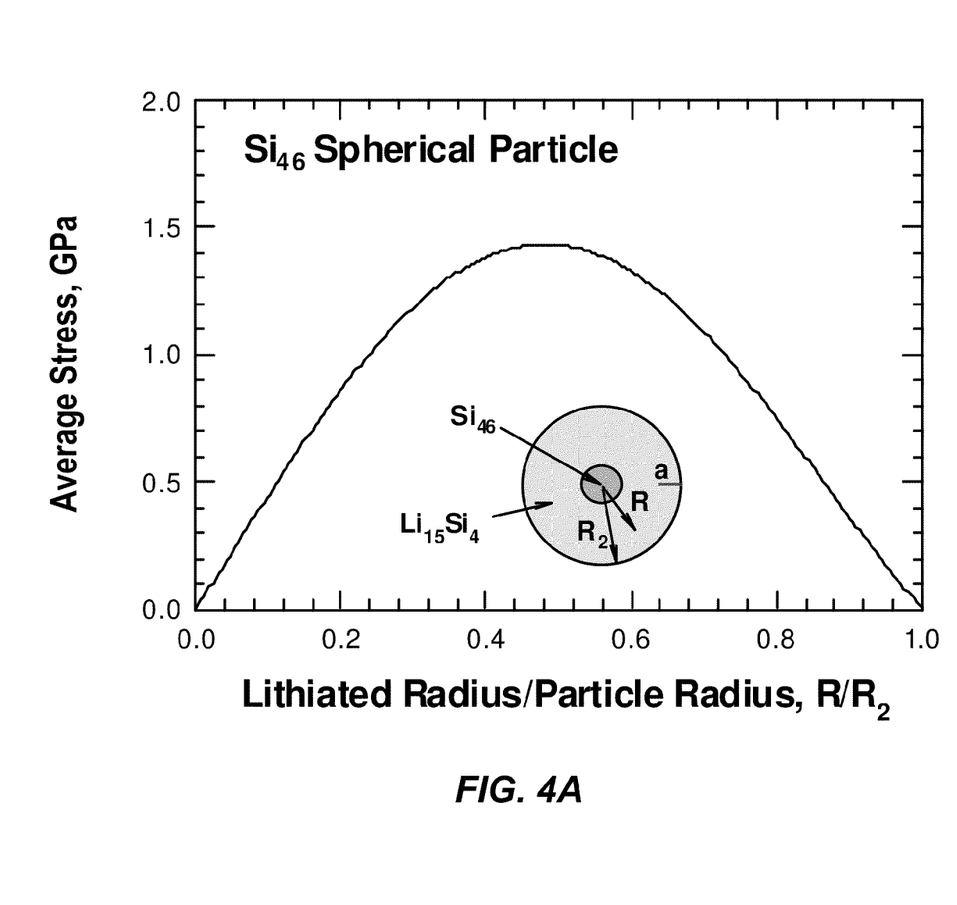
FIGS. 4A and 4B illustrate the computed average stress and corresponding stress intensity factor during lithiation of $Si_{46}$ spherical particles.
Figure 4B:
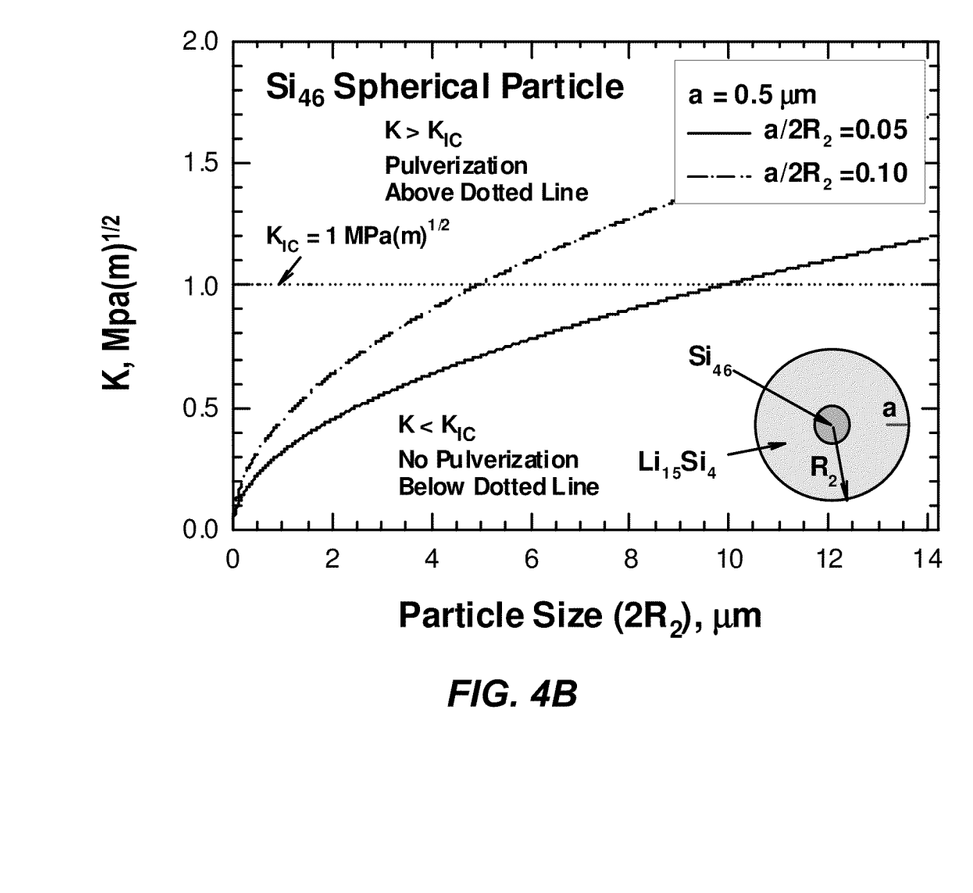

Lithiation stress computations were next performed for anodes made from $Si_{46}$ spherical particles, cylindrical particles, or thin-film using analysis methods according to: Brooksbank, D. Andrews, K. W., Journal of the Iron and Steel Institute, 1969, 207, 474-483; Huggins, R. A., Nix, W. D., Ionics, 2000, 6, 57-64. The results of the average lithiation stresses and the corresponding stress intensity factor for $Si_{46}$ spherical particles are presented in FIG. 4A and FIG. 4B. The average lithiation stress reaches a maximum of about 1.4 GPa when the spherical particle is 50% lithiated at $R/R_2$=0.5, as shown in FIG. 4A, where R is the radius of the lithiated material ($Li_{15}Si_4$) and $R_2$ is the radius of the unlithiated $Si_{46}$ particle. In comparison, the theoretical fracture strength of $Si_{46}$, computed by first-principles methods, is about 14 GPa. In addition, FIG. 4B indicates that $Si_{46}$ particles with a particle size of 5-10 μm would not pulverize after lithiation for a crack depth (5 μm) that is less than 0.05 to 0.1 of the particle diameter ($2R_2$), since the corresponding stress intensity factor values are less than the fracture toughness of $Si_{46}$ ($K_{IC}$=1 MPa(m)$^{1/2}$).

Figure 5A:
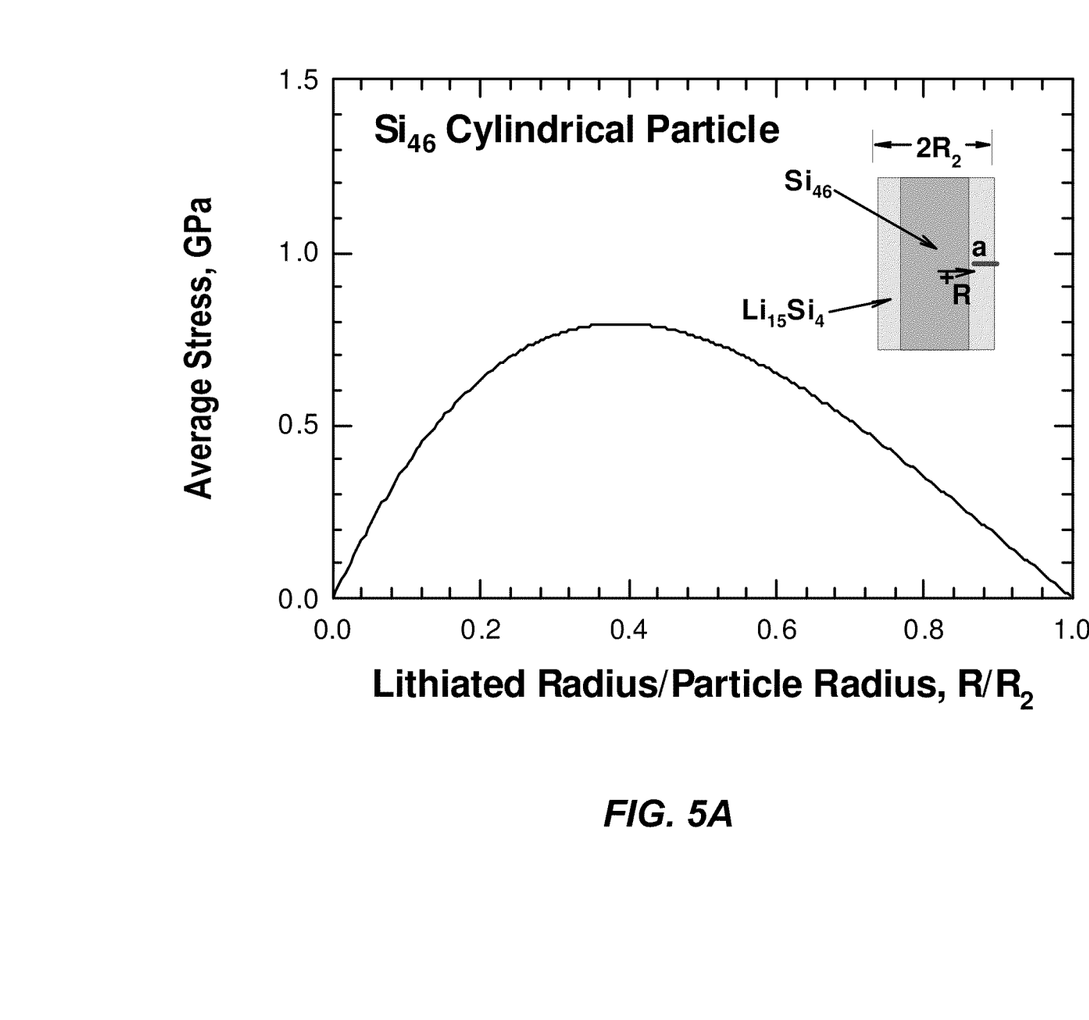
FIGS. 5A and 5B illustrate the computed average stress and the corresponding stress intensity factor during lithiation of $Si_{46}$ cylindrical particles.
Figure 5B:
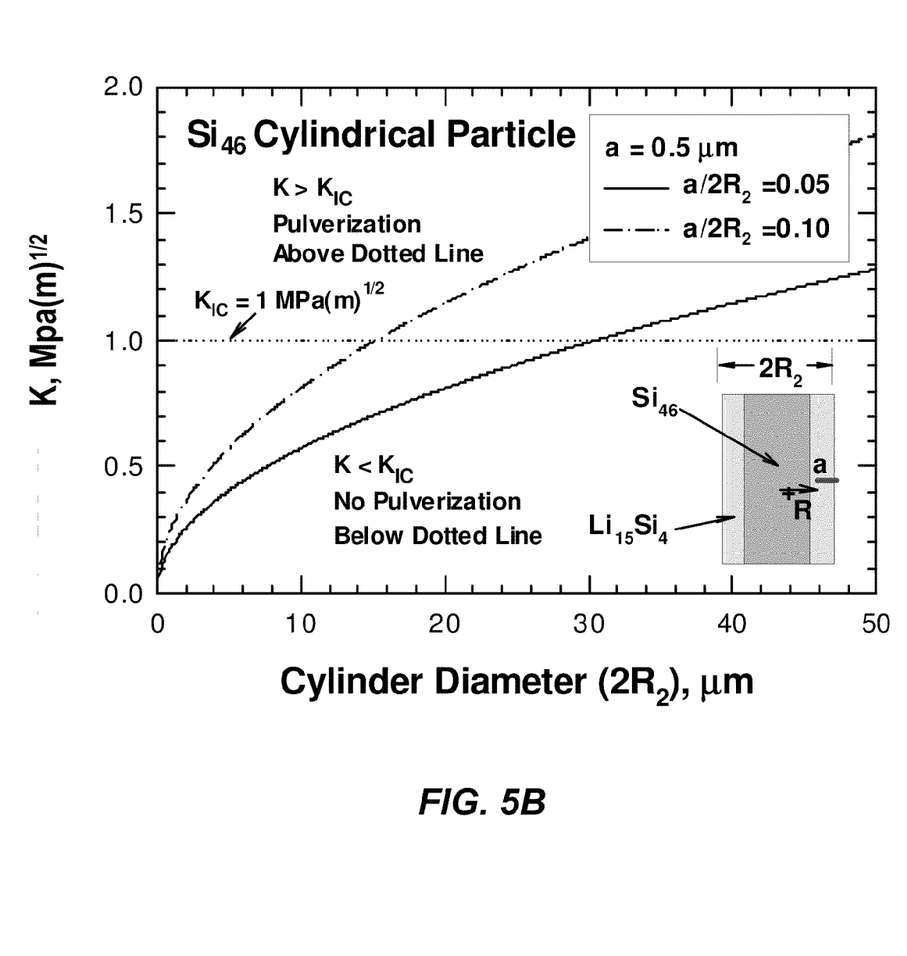
Figure 6:
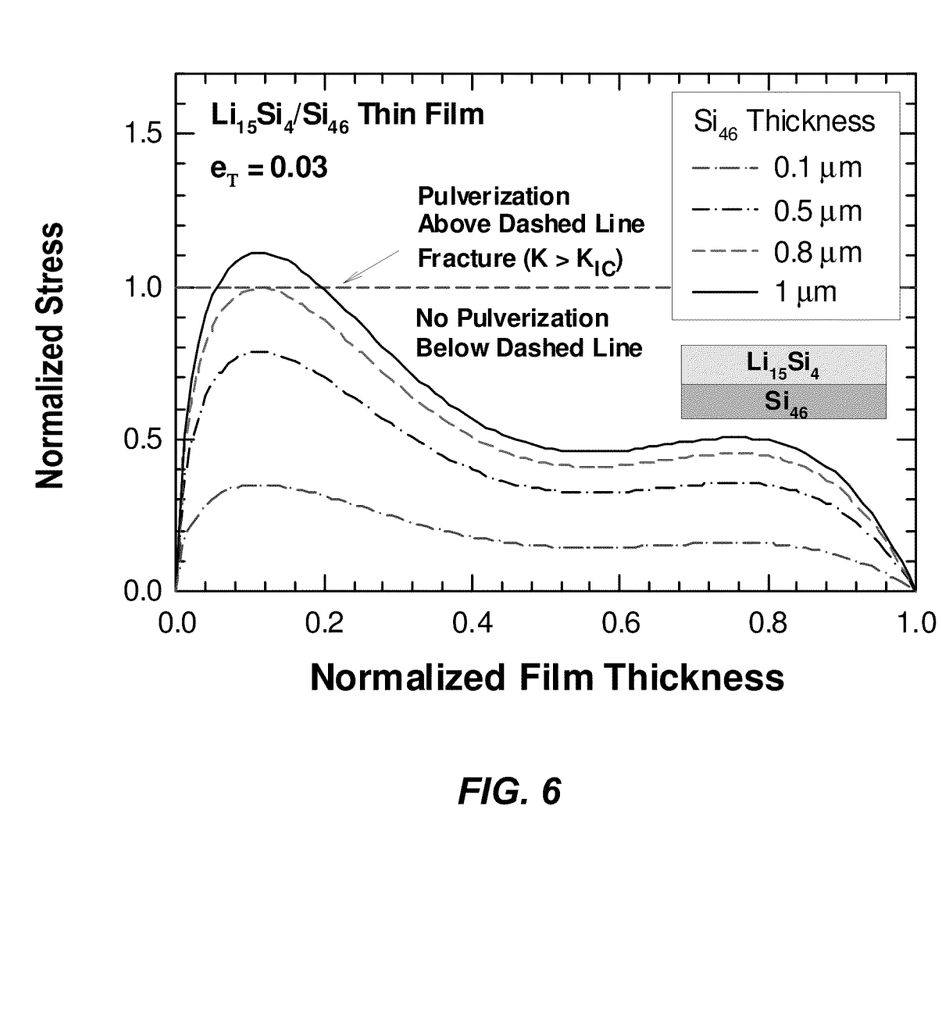
FIG. 6 shows the lithiation stress normalized by the fracture stress as a function of the lithiated thickness normalized by the total film thickness for lithiation of $Si_{46}$ films.

The results of the average lithiation stresses and the corresponding stress intensity factor for $Si_{46}$ cylindrical particles with a diameter of $2R_2$ are presented in FIGS. 5A and 5B. The average lithiation stress reaches a maximum of about 0.8 GPa when the spherical particle is 60% lithiated at $R/R_2$=0.4, as shown in FIG. 6(a). In comparison, the theoretical fracture strength of $Si_{46}$, computed by first-principles computational methods at SwRI, is about 14 GPa. In addition, FIG. 5B indicates that $Si_{46}$ particles with a cylinder diameter of 15-30 μm would not pulverize after lithiation for a crack depth (5 μm) that is less than 0.05 to 0.1 of the cylinder diameter ($2R_2$), since the corresponding stress intensity factor values are less than the fracture toughness of $Si_{46}$ ($K_{IC}$=1 MPa(m)$^{1/2}$).

As noted herein, cage structures such as silicon clathrate are particularly attractive for applications in thin film batteries because of its relatively low volume expansion when it is lithiated to form $Li_{15}Si_4$. FIG. 6 shows the lithiation stress normalized by the fracture stress as a function of the lithiated thickness normalized by the total film thickness for lithiation of $Si_{46}$ films. In this plot the critical condition for fracture or pulverization occurs when the normalized stress value exceeds unity and is shown as the dashed line. For $Si_{46}$ thin film anodes, the critical film thickness is about 0.8 μm. For film thickness at or below 0.8 μm, $Si_{46}$ thin film would not pulverize after lithiation. In contrast, $Si_{46}$ thin films thicker than 0.8 μm would pulverize after lithiation. The transformation or lithiation strain ($e_r$) is taken to be 0.03.

As noted above, the cage structures such as the silicon clathrate described herein, which may preferably include $Si_{46}$ clathrate, may be supplied in particulate form with varying geometry (spherical, cylindrical, plate-like, etc.). The size of any particulate form may be such that the largest linear dimension is less than or equal to 100.0 μm. Preferably, for cylindrical particles the size may therefore be less than or equal to 100.0 μm, or fall within the range of 0.1 μm to 100.0 μm. For thin-film geometries, it is preferably that the largest linear dimension is less than or equal to 50 μm, e.g., in the range of 0.1-50.0 μm.

The particulate cage structure may then be combined with a polymeric binder and optionally a conductive additive such as carbon black. Suitable polymeric binders for the anode herein may include polymeric materials such as poly(vinylidine fluoride and carboxymethylcellulose (CMC). The level of particulate cage structure in such binder, such as the $Si_{46}$ clathrate, may be at a level up to 95.0% by weight. Accordingly, the cage structure in the binder may be at a level of 50.0%-95.0% by weight in any 1.0% increment. The electrically conductive additives which may promote electrical conductivity of the electrode herein may include, e.g., carbon black, carbon nanotubes, conductive nanofibers, graphite, graphene, etc. The conductive additives may be present at a level of up to 20.0% by weight. Accordingly, the conductive additives may be present at a level of 1.0%-20.0% by weight in increments of 0.1%.

The particulate cage structure, polymer binder and optional conductive additive may be formed into a liquid or high viscosity paste form, optionally in the present of a solvent and then allowed to dry on a given conductive substrate to form an anode type electrode. The substrate may then be attached to (or make up) the current collector in a typical Li-ion battery. The materials for the substrate may therefore include, but are not limited to, stainless steel, copper, nickel, aluminum and other materials that are inert to lithium. The current collector can also be comprised of flexible materials such as elastomeric polymeric resins (e.g. polymeric materials that have an elongation of greater than 100% and which are then capable of recovering 75% or more of such elongation). Such elastomeric materials may be coated with a layer of metal, such as those noted above, in order to provide a requisite amount of electrical conductive capability for use within, e.g., a lithium-ion battery.

The cathode electrode herein may contain an electrode composed of powder composite materials that are typically employed in a Li-ion battery. Such material may therefore include $LiCoO_2$, $LiFePO_4$, $LiMnO_2$, $LiMn_2O_4$, and $LiNiO_2$. Between the two electrodes is an ionically conducting and electrically insulating electrolyte that facilitates transport of ions between the electrodes. This region preferably includes a membrane separator soaked with electrolyte. The electrolyte may preferably be a Li salt dissolved in an organic solvent. For example, the electrolyte may include 1M $LiPF_6$ in a 1:1 w/w ethylene carbonate/diethyl carbonate solvent. The electrolyte may also be a Li salt mixed with a solid ionically conducting material such as a an electrically conductive polymer or inorganic type material.

The anode electrodes noted herein that are produced from the cage structures such as the silicon clathrate $Si_{46}$ may be formed in relatively thin films for a Li and/or Li-ion battery. In such a configuration a film of $Si_{46}$ may be deposited on the metal substrate which as noted, serves as the current collector. The thickness of such film may be less than or equal to 50.0 μm in thickness, such as in the range of 0.1-50.0 μm in thickness. A solid electrolyte may then be positioned on top of the $Si_{46}$ anode and a cathode layer may be subsequently deposited on top of the solid electrolyte to form a Li or Li-ion battery cell. The electrolyte may include but not be limited to inorganic electrolytes such as LiPON. The cathode material, as noted herein, includes but is not limited to $LiCoO_2$, $LiFePO_4$, $LiMnO_2$, $LiMn_2O_4$, and $LiNiO_2$.

What is claimed is:

1. An electrode for a battery wherein said electrode comprises silicon clathrate $Si_{46}$ or $Si_{34}$ having a volume expansion of less than or equal to 12.0% upon lithiation of said silicon clathrate.

2. The electrode of claim 1 wherein said silicon clathrate comprises silicon clathrate $Si_{46}$ containing an arrangement of 20-atom and 24-atom cages fused together through 5 atom pentagonal rings.

3. The electrode of claim 1 wherein said silicon clathrate comprises silicon clathrate $Si_{34}$ containing an arrangement of 20-atom and 28-atom cages fused together through 5 atom pentagonal rings.

4. The electrode of claim 1 wherein said silicon clathrate comprises particles having a largest linear dimension in the range of 0.1 μm to 100.0 μm.

5. The electrode of claim 1 wherein said silicon clathrate comprises particles having a spherical geometry having a largest linear dimension of 0.1 μm to 100.0 μm.

6. The electrode of claim 1 wherein said electrode comprises a metal substrate and said silicon clathrate is present on the surface of said metal substrate.

7. The electrode of claim 6 wherein said silicon clathrate is present on said surface of said metal substrate at a thickness of 0.1 μm to 50.0 μm.

8. The electrode of claim 1 wherein said silicon clathrate is combined with a polymeric binder wherein said silicon clathrate is present in said binder at a level of 50.0-95.0% by weight.

9. The electrode of claim 1 including an electrically conductive additive.

10. The electrode of claim 1 wherein said electrode comprises an anode electrode in a Li battery.

11. The electrode of claim 1 wherein said electrode comprises an anode electrode in a Li-ion battery.

12. A lithium-ion battery comprising an anode containing silicon clathrate $Si_{46}$ or $Si_{34}$, a cathode and an electrolyte wherein the anode has a volume expansion of less than or equal to 12.0% upon lithiation of said silicon clathrate.

13. The lithium-ion battery of claim 12 wherein said silicon clathrate comprises silicon clathrate $Si_{46}$ containing an arrangement of 20-atom and 24-atom cages fused together through 5 atom pentagonal rings.

14. The lithium-ion battery of claim 12 wherein said silicon clathrate comprises silicon clathrate $Si_{34}$ containing an arrangement of 20-atom and 28-atom cages fused together through 5 atom pentagonal rings.

15. The lithium-ion battery of claim 12 wherein said silicon clathrate comprises particles having a largest linear dimension in the range of 0.1 μm to 100.0 μm.

16. The lithium-ion battery of claim 12 wherein said silicon clathrate comprises particles having a spherical geometry having a largest linear dimension of 0.1 μm to 100.0 μm.

17. The lithium-ion battery of claim 12 wherein said anode comprises a metal substrate and said silicon clathrate is present on the surface of said metal substrate.

18. The lithium-ion battery of claim 17 wherein said silicon clathrate is present on said surface of said metal substrate at a thickness of 0.1 μm to 50.0 μm.

19. An electrode for a battery wherein said electrode comprises silicon clathrate $Si_{46}$ containing an arrangement of 20-atom and 24-atom cages fused together through 5 atom pentagonal rings and wherein said silicon clathrate comprises particles having a largest linear dimension in the range of 0.1 μm to 100.0 μm and a volume expansion of less than or equal to 12.0% upon lithiation of said silicon clathrate.

20. The electrode of claim 19 wherein said silicon clathrate comprises particles having a spherical geometry.

21. The electrode of claim 19 wherein said electrode comprises a metal substrate and said silicon clathrate is present on the surface of said metal substrate.

22. A method of forming an electrode comprising combining silicon clathrate $Si_{46}$ or $Si_{34}$ in a polymeric binder and forming an electrode wherein said silicon clathrate is present in said binder at a level of 50.0-95.0% by weight and wherein said silicon clathrate is present as particles having a largest linear dimension in the range of 0.1 μm to 100.0 μm and a volume expansion of less than or equal to 12.0% upon lithiation of said silicon clathrate.

* * * * *